Dec. 23, 1941.  A. H. ROOS  2,267,424
BEATER
Original Filed Jan. 4, 1937

INVENTOR
A. H. Roos
BY
ATTORNEY

Patented Dec. 23, 1941

2,267,424

UNITED STATES PATENT OFFICE 2,267,424

BEATER

Axel H. Roos, Chico, Calif.

Continuation of application Serial No. 118,955, January 4, 1937. This application June 6, 1938, Serial No. 212,051

1 Claim. (Cl. 259—131)

This invention relates generally to a culinary article and in particular relates to an improved form of beater for use in connection with the preparation of foods. The beater illustrated in the present instance is an improvement over that shown in my United States Letters Patent No. 2,028,921, issued January 28, 1936, and is a continuation of my copending application Ser. No. 118,955, filed January 4, 1937.

The main object of this invention is to provide a dual-blade paddle or beater unit in which the blades are so formed and are of such configuration that a more efficient and rapid picking-up and beating action is had with a relatively slow speed of the beater; the air will be beaten out of eggs without removing their moisture; all the eggs or other matter being beaten, even at the very bottom of the vessel, will be drawn into the zone of influence of the beater and acted on without leaving any unbeaten or liquid residue, and a very light, fine-textured and smooth mix is obtained. Also, splashing of the material is prevented.

A further object of my invention is to provide a mounting arrangement for the dual blade units which, while being of simple construction, maintains the blades firmly in position.

A further object of the invention is to produce a simple, inexpensive, sanitary and easily cleaned device and yet one which will be exceedingly effective for the purpose for which it is designed.

These objects I accomplish by means of such structure and relative arrangement of parts as will fully appear by a perusal of the following specification and claim.

In the drawing similar characters of reference indicate corresponding parts in the several views.

Figure 1:
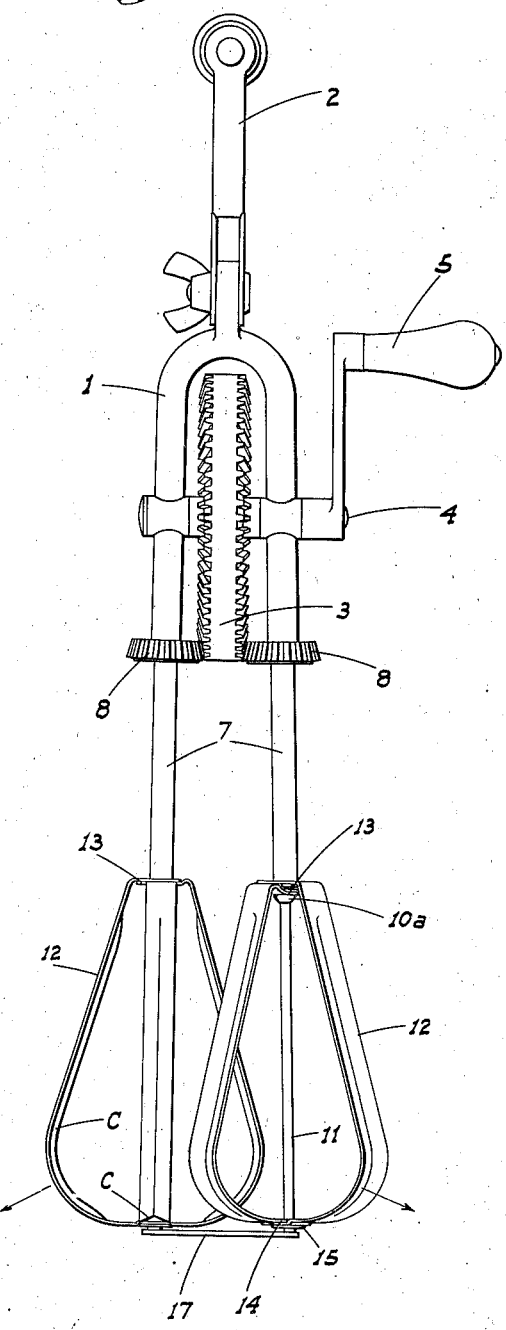
Figure 1 is a side elevation of my improved beater.

Referring now more particularly to the characters of reference on the drawing, the device comprises an inverted U-shaped frame 1 provided with an upwardly extending handle 2 adjustably mounted in the same manner as shown in my above mentioned United States patent. A two-faced bevel gear 3 is rotatably journaled on a shaft 4 between the legs of the frame, the supporting shaft having a crank 5 secured to one end thereof.

A fixed shaft 6 projects downward from each leg of the frame 1, such shafts being substantially parallel and of less diameter than the legs on which they are rigidly mounted. A turnable sleeve 7 is disposed on each shaft 6 and is longitudinally co-extensive therewith. A bevel pinion 8 is secured on the upper end of each sleeve and meshes with one face of gear 3.

The lower end of each shaft 6 is formed with a bore 9 into which is driven a drive screw 10 which is formed in unitary connection with a rod 11 which projects axially some distance from each screw 10, the rods 11 being axially alined with shafts 6. The head of each drive screw 10, indicated as 10a, is of sufficient size to engage the lower end of the adjacent sleeve 7 and to maintain the sleeve in place in the manner clearly shown in Fig. 2 of the drawing.

Each beater unit comprises a pair of paddle elements 12 set in crossing relation. Each element as a whole is of substantially pear-shaped configuration, being given this form by a narrow metal strip which provides two opposed blades symmetrical to the axis of the element.

Figure 2:
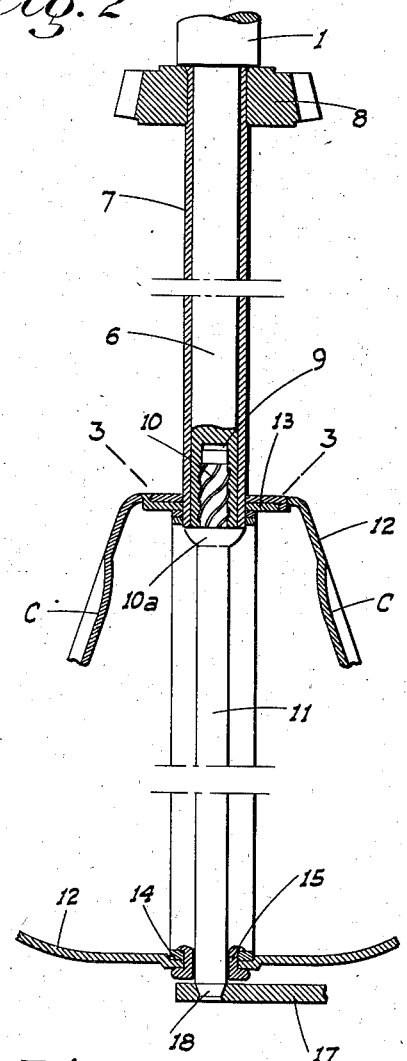
Figure 2 is an enlarged fragmentary sectional elevation of the device.
Figure 3:
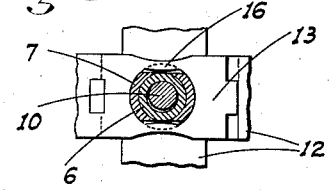
Figure 3 is a sectional view on line 3—3 of Fig. 2.

At the bottom, each blade is initially flat, and is then formed with an upwardly extending circularly curved portion A, which merges into a straight tangentially extending portion B of relatively great length, which converges toward the corresponding portion of the opposite blade. The blades, from adjacent the bottom inception of the curved portions A to adjacent their upper ends, are exteriorly groved or of V-shaped form in cross section as shown at C, which together with the shape of the blades, is a very important factor. At the top, the opposed blades are bent horizontally and overlap each other, as at 13, the overlapping portions being secured together as shown in Fig. 2. At the bottom, the two paddle elements, which as stated cross each other at right angles, are provided with central oppositely offset and cooperating portions 14.

Each blade unit comprises two pear-shaped elements 12. Each of such elements is formed of narrow metal strips which are lapped and secured together at the upper end or top of the element, as at 13. The elements of each blade are disposed coaxially and at right angles to each other, and at the bottom are provided with central, oppositely offset portions 14 which cooperate with each other in crossing relationship. The elements are concave, as at C, on their outer faces for a certain portion of their length.

Each blade unit is drilled with a centrally disposed hole in each end, the hole in the upper end being of such diameter to permit the sleeve 7 to snugly project therethrough while the lower hole is of sufficient size as to receive a securing eye 15 which clamps the offset portions 14 together.

Each blade unit is mounted on the device in the following manner. Adjacent its lower end each sleeve 7 is formed with opposed grooves 16 of approximately the same thickness as the lapped portions of the outermost element or those portions which are on top. Each blade unit is slipped on the lower end of the shaft until said top portions are in register with the grooves. Such portions are then struck on both sides and deformed and driven into the grooves, as at 16, fixedly securing said portions to the sleeve 7. Even though only one pair of the lapped portions is thus secured to the shaft, the eye 15 at the other end of the blade unit maintains the offset portions 14 of both blade elements in fixed cooperating positions against longitudinal separation or relative rotation.

When the blade units are secured to the sleeves, the rods 11 project through eyes 15 and terminate a short distance therebelow. A tie plate 17 extends between the lower ends of said rods, projecting through holes in the blade and being headed over as at 18. The holes are initially roughened so that when the rod heads are headed over, the rods cannot thereafter turn. This prevents escape of drive screws 10 from the shaft 6.

The particular flat form of the blades at the bottom as previously described provides a relatively great blade surface close to the bottom of the bowl in which the beater is used, so that the blades pass through the matter being beaten at a correspondingly low level. The concave or V form of the blades provides air passages extending from the bottom portion of the blades upwardly to atmosphere above the top of the matter in the bowl, on account of the relatively great height of the blades, which brings their upper ends well clear of any normal amount of matter being beaten, and which even then may be quite deep. These air passages, with the rotation of the paddle elements, causes a tendency to vacuum to be created at the bottom of the passages and blades, drawing the lowermost strata of the matter being beaten into the path of the rotating blades. Every bit of such matter is thus positively acted on and beaten and this positive action enables the beater to be efficiently operated at a much slower speed than is ordinarily possible.

Also, my beater has the same effect in action as a "French whip," without calling for as much effort. In thus functioning, my beater does not destroy any of the oils found in eggs, and does not cause any separation of the various constituents of the eggs.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent is:

In a beater, a vertical driven sleeve, a beater blade depending from the sleeve and comprising a strip element bent to predetermined shape with its ends overlapping and in contact at the top and surrounding the sleeve; the sleeve having a tangential groove of a depth to receive the overlapped portion of the blade, said portions being pressed from their outside edge into the groove whereby to connect the sleeve and beater for rotation as a unit and also prevent vertical separation of the overlapped ends of the blade.

AXEL H. ROOS.